United States Patent
Morris

(10) Patent No.: US 9,816,239 B1
(45) Date of Patent: Nov. 14, 2017

(54) FENCE FOOTING

(71) Applicant: Vincent P. Morris, Alameda, CA (US)

(72) Inventor: Vincent P. Morris, Alameda, CA (US)

(73) Assignee: ERTEC ENVIRONMENTAL SYSTEMS LLC, Alameda, CA (US)

( * ) Notice: Subject to any disclaimer, the term of this patent is extended or adjusted under 35 U.S.C. 154(b) by 104 days.

(21) Appl. No.: 14/279,977

(22) Filed: May 16, 2014

Related U.S. Application Data

(60) Provisional application No. 61/824,374, filed on May 17, 2013.

(51) Int. Cl.
*E02B 3/02* (2006.01)
*E04H 17/00* (2006.01)
*E04H 17/14* (2006.01)

(52) U.S. Cl.
CPC ............ *E02B 3/023* (2013.01); *E04H 17/14* (2013.01)

(58) Field of Classification Search
CPC .......................... E02B 3/12–3/16; E02D 17/20
See application file for complete search history.

(56) References Cited

U.S. PATENT DOCUMENTS

| | | | |
|---|---|---|---|
| 929,728 A * | 8/1909 | Taylor | 405/19 |
| 1,618,288 A | 2/1927 | Kinzie | |
| 2,341,515 A * | 2/1944 | Rehfeld | E02B 3/124 405/32 |
| 3,112,262 A | 11/1963 | Parkinson | |
| 3,455,112 A | 7/1969 | Twele | |
| 4,279,535 A | 7/1981 | Gagliardi | |
| 4,301,996 A | 11/1981 | Holyoak | |
| 4,721,408 A | 1/1988 | Hewlett | |
| 4,804,299 A * | 2/1989 | Forte | E02D 29/0241 405/262 |
| 4,854,773 A | 8/1989 | Nicoll | |
| 5,108,224 A | 4/1992 | Cabaniss | |
| 5,157,867 A * | 10/1992 | Fritch | 47/33 |
| 5,257,878 A | 11/1993 | Peterson | |
| 5,338,131 A | 8/1994 | Bestmann | |
| 5,575,584 A | 11/1996 | Alsop | |
| 5,580,190 A * | 12/1996 | Hsu | 405/302.6 |
| 5,584,600 A * | 12/1996 | Langdon | 405/16 |
| 5,605,416 A | 2/1997 | Roach | |
| 5,632,888 A | 5/1997 | Chinn et al. | |
| 5,641,243 A * | 6/1997 | Hsu | 405/15 |
| 5,733,825 A | 3/1998 | Martin et al. | |
| 5,944,443 A | 8/1999 | Benedict | |

(Continued)

FOREIGN PATENT DOCUMENTS

| | | | |
|---|---|---|---|
| CA | 2533232 A1 * | 7/2006 | |
| GB | 2171131 | 8/1986 | |
| WO | WO 2007005895 A2 * | 1/2007 | |

*Primary Examiner* — Tara M. Pinnock
(74) *Attorney, Agent, or Firm* — T. H. P. Richardson

(57) ABSTRACT

Assemblies and methods for securing an elongate apertured fence to the ground. The fence includes an upper section which is apertured and which extends upwards from the ground, and a lower section which may or may not be apertured and which is not buried in the ground. The lower section is contacted by a footing member which is secured to the ground and which stabilizes the fence along a desired line along the ground. In some embodiments, the lower fence section is parallel to the ground, and at least part of the footing member lies between the lower fence section and the ground.

20 Claims, 1 Drawing Sheet

(56) References Cited

U.S. PATENT DOCUMENTS

| | | |
|---|---|---|
| 5,954,451 A | 9/1999 | Presby |
| 5,954,952 A | 9/1999 | Strawser, Sr. |
| 6,017,166 A | 1/2000 | Mossburg |
| 6,109,835 A | 8/2000 | Grabhorn |
| 6,214,216 B1 | 4/2001 | Isaacson |
| 6,277,473 B1 | 8/2001 | McGinn |
| 6,332,737 B1 | 12/2001 | Mattson |
| 6,422,787 B1 | 7/2002 | Mikell |
| 6,497,532 B1 | 12/2002 | McGinn |
| 6,505,996 B1 | 1/2003 | Ianniello et al. |
| 6,547,493 B2 | 4/2003 | Spangler et al. |
| 6,551,505 B2 | 4/2003 | Chinn et al. |
| 6,641,335 B1 | 11/2003 | Allard |
| 6,709,579 B1 | 3/2004 | Singleton et al. |
| 6,733,209 B2 | 5/2004 | Allard |
| 6,811,708 B2 | 11/2004 | Shaw et al. |
| 6,848,866 B1 | 2/2005 | McGinn |
| 6,905,289 B1 | 6/2005 | Sanguinetti |
| 6,929,425 B1 | 8/2005 | Kimberlin et al. |
| 6,974,540 B1 | 12/2005 | Fleischmann |
| 7,008,144 B2 | 3/2006 | McGinn |
| 7,131,787 B2 | 11/2006 | McGinn |
| 7,172,372 B2 | 2/2007 | McGinn |
| 7,544,016 B2 | 6/2009 | McGinn et al. |
| 7,955,030 B2 | 6/2011 | McGinn et al. |
| 8,402,630 B2 | 3/2013 | McGinn et al. |
| 2002/0020658 A1 | 2/2002 | Isaacson |
| 2002/0172564 A1* | 11/2002 | Brown ................ 405/302.6 |
| 2003/0095833 A1 | 5/2003 | Janz |
| 2003/0143026 A1 | 7/2003 | Santha |
| 2005/0089376 A1* | 4/2005 | Maxwell ............. 405/302.6 |
| 2006/0226406 A1* | 10/2006 | Vise ................... E04H 17/24 256/19 |
| 2007/0280789 A1* | 12/2007 | Mason ................ 405/302.6 |
| 2008/0157044 A1* | 7/2008 | Barfield ............. E02D 17/202 256/12.5 |
| 2010/0154347 A1* | 6/2010 | Jessen .................... 52/698 |
| 2011/0311318 A1* | 12/2011 | Taylor .................... 405/284 |

* cited by examiner

FENCE FOOTING

CROSS-REFERENCE TO RELATED APPLICATIONS

This application claims priority from and is entitled to the benefit of U.S. provisional application 61/824,374, filed May 17, 2013, by Vincent P Morris. This application is related to U.S. Pat. Nos. 6,848,866, 7,008,144 7,131,787, 7,172,372, 7,554,016, 7,955,030 and 8,402,630. The entire disclosure of that application and of each of those patents is incorporated by reference herein for all purposes.

BACKGROUND OF THE INVENTION

This invention relates to assemblies and methods for installing fences, in particular, but not limited to, (i) apertured fences for controlling the movement of small vertebrates, and (ii) apertured fences for collecting sediment from sediment-containing water.

SUMMARY OF THE INVENTION

In some cases, the recommended installation of apertured fences includes creating a trench in the ground, burying the bottom section of the fence in the ground, and backfilling the trench. This method of installation ensures that there will not be a gap, either at the time of installation or subsequently, between the bottom of the fence and the ground. However, the need to make a trench is time-consuming and sometimes, depending on the terrain, difficult. This invention relates to an alternative method of securing the bottom of an apertured fence to the ground. In many cases, this alternative method replaces the installation by means of a trench in the ground.

This invention provides assemblies and methods for securing an elongate apertured fence to the ground, and fences suitable for use in such assemblies and methods. The fence includes an upper section which is apertured and which extends upwards from the ground, and a lower section which may or may not be apertured and which is not buried in the ground. The lower section is contacted by a footing member which is secured to the ground and which stabilizes the fence at a desired location. In some, but not all, embodiments of the invention, the lower section is parallel to the ground, and at least part of the footing member lies between the lower section of the fence and the ground.

In a first aspect, this invention provides an assembly which comprises
  (1) an elongate area of ground;
  (2) an elongate fence which extends along a line on the elongate area of ground and which comprises
    (a) a first elongate fence portion which (i) comprises apertures, and (ii) extends upwards from the ground, and
    (b) a second elongate lower fence portion which is not buried in the ground;
  (3) an elongate footing member which contacts the second fence portion and stabilizes the fence along the line on the ground; and
  (4) securing members which secure the footing member to the ground.
Preferably each of the second fence portion and the footing member is substantially planar, and the second fence portion and the footing member are parallel to each other In many cases, the assembly also includes posts which secure at least the first fence portion in a desired position relative to the ground, the posts preferably being secured to the surface of the first fence portion which is remote from the footing member.

In a second aspect, this invention provides a method of making an assembly according to the first aspect of the invention, the method comprising the steps of
  (A) providing an assembly which comprises the elongate fence and the elongate footing member in contact with the second fence portion;
  (B) before or after step (A), placing the fence so that the second fence portion of the fence extends along the line on the elongate area of ground, and the first fence portion extends upwards from the ground; and
  (C) securing the footing member to the ground.

In a third aspect, the invention provides an elongate fence suitable for use in an assembly according to the first aspect of the invention, the fence comprising
  (1) a first elongate fence portion which comprises apertures,
  (2) a second elongate lower fence portion which is secured to the first fence portion along an elongate line and which preferably substantially planar, and
  (3) an elongate footing member at least part of which is secured to the second fence portion and not to the first fence portion.

BRIEF DESCRIPTION OF THE DRAWINGS

The invention is illustrated in the accompanying drawings which are diagrammatic sketches and are not to scale, and in which.

DETAILED DESCRIPTION OF THE INVENTION

Figures 1, 2:
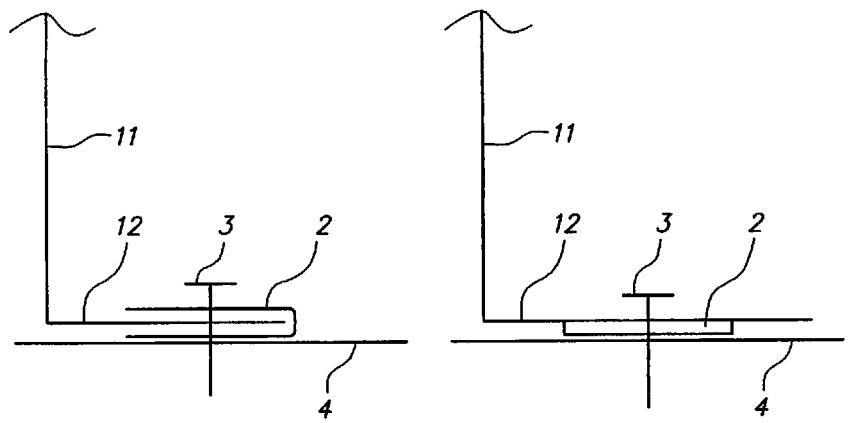
FIGS. 1-4 are cross-sectional side views of exemplary assemblies of the invention.

In the Summary of the Invention above, the Detailed Description of the Invention, the Examples, and the claims below, and in the accompanying drawings, reference is made to particular features of the invention, including for example components, ingredients, devices, apparatus, systems, test results and steps. It is to be understood that the disclosure of the invention in this specification includes all possible combinations of such particular features. For example, where a particular feature is disclosed in the context of a particular mode, aspect, embodiment, Figure or claim, that feature can also be used, to the extent possible, in the context of any other particular mode, aspect, embodiment, Figure or claim, and in the invention generally. The invention disclosed and claimed herein includes embodiments not specifically described herein and can for example make use of features which are not specifically described herein but which provide functions which are the same, equivalent or similar to, features specifically disclosed herein.

The term "comprises" and grammatical equivalents thereof are used herein to mean that other features are optionally present. For example, a fence "comprising" (or "which comprises") a free portion and a lower portion can contain only the free portion and the lower portion or can contain not only the free portion and the lower portion but also one or more other portions. Where reference is made herein to a method comprising two or more defined steps, then, unless the context requires otherwise, the defined steps can be carried out in any order or simultaneously, and the method can include one or more other steps which are carried out before any of the defined steps, between two of the defined steps, or after all the defined steps. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. When, in this specification, a range is given as "(a first number) to (a second number)" or "(a first number)-(a second number)", this means a range whose lower limit is the first number and whose upper limit is the second number. For example, "0.5-3" means a range whose lower limit is 0.5, and whose upper limit is 3. The numbers given herein should be construed with the latitude appropriate to their context and expression. The terms "plural" and "plurality" are used herein to mean two or more. When reference is made herein to "a", "an", "one" or "the" feature, it is to be understood that, unless the context requires otherwise, there can be one or more than one such feature.

Where reference is made herein to two or more components (or parts or portions etc.), it is to be understood that the components can be, unless the context requires otherwise, separate from each other or integral parts of a single structure or a single component acting as the two or more specified components.

The term "fence" is used in this specification to denote an article which comprises a first up elongate fence portion which comprises apertures and a second lower elongate fence portion which is attached to the first fence portion and which optionally comprises apertures. In many cases, the fence includes an elongate filter component which is secured to the first fence portion, generally a lower portion of the first fence portion. The filter component optionally extends into part or all of the second fence portion. Examples of such fences are described in the US Patents incorporated by reference herein, where they are described for example as a barrier device (for example for controlling the movement of small vertebrates) or a sediment control device. Before installation of the fence in accordance with the invention, the first and second fence portions can be coplanar or at an angle to each other. In many, but not all assemblies of the invention, the first portion extends upwards from the ground and the second fence portion is at an angle, often substantially a right angle, to the first portion.

Where reference is made herein to a fence portion which is apertured, all the apertures in any particular sheet will generally be of the same size and shape, and the apertured fence portion will generally be composed of polymeric strands of the same size and shape.

The First Fence Portion.

The first elongate fence portion comprises apertures, so that the fence can provide a barrier through which wind and storm water runoff can pass but which will prevent or hinder the passage of undesirable elements, for example endangered species and/or sediment. For a detailed description of preferred fences whose purpose is to control the movement of small vertebrates, reference may be made to U.S. Pat. No. 8,402,630. For a detailed description of preferred fences whose purpose is to control the movement of sediment, reference may be made to U.S. Pat. No. 7,955,030, U.S. Pat. No. 7,544,016, U.S. Pat. No. 7,172,372, U.S. Pat. No. 7,131,787, U.S. Pat. No. 7,008,144 and. U.S. Pat. No. 6,848,866.

In one embodiment, the first fence portion is planar and extends upwards from the ground, with the lower portion of the first fence portion often being substantially vertical, for example at right angles to the ground, but sometimes as an angle to the ground, particularly if the ground is not horizontal. In another embodiment, the first fence portion comprises a first elongate planar component which extends upwards from the ground and a second elongate planar component which is at an angle, for example an angle of 20-60°, to the first component.

In other embodiments of the invention, the first fence portion comprises a threshold member having a multiplicity of relatively large threshold apertures therethrough, an elongate outflow member having multiplicity of relatively large outflow apertures therethrough, and, between the threshold member and the outflow member, an elongate filter member which has a multiplicity of relatively small filter apertures therethrough, the threshold member, outflow member and the filter being secured together, preferably being secured together so that any hollow space between them is less than 30% of the total volume of the barrier member, for example so that there is no hollow space between them.

The Second Fence Portion.

The second fence portion can be composed of a material which has the same apertures as the first fence portion, in which case, the upper and lower portions of the fence can be monolithic. Alternatively, the lower portion of the fence can be composed of a different material and be directly or indirectly attached to the first fence portion, in which case, the second fence portion can be composed of a material having apertures which are different from those in the first fence portion, or a material having no apertures.

The second fence portion, prior to installation, can be substantially coplanar with the first fence portion. In many embodiments of the invention, the first fence portion is bent at an angle to the second fence portion before or after the lower portion has been secured to the ground. However, in one embodiment of the invention, the footing member has a first part of which is secured to a generally vertical second fence portion and a second part which extends at an angle from the first part so that the second component can be secured to the ground.

When the second fence portion, when it is installed, is at an angle to the first fence portion so that it is generally parallel to the ground, its width can for example be 4 to 24 inches, e.g. 5 to 8 inches. The width of second fence portion which contacts the footing member can for example be at least 2 inches, e.g. 3 to 8 inches.

When the second fence portion extends upwards from the ground, and the footing member is, therefore, bent so that a first part of the footing member contacts the second fence portion and a second part of footing member extends at an angle away from the first part and contacts the ground, the height of the second fence portion which contacts the footing member can for example be at least 2 inches, e.g. 3 to 8 inches.

The Footing Member.

At least part of the footing member is adjacent to the ground. The ground on which the footing member is to be laid can be, but is not necessarily, smoothed before laying the footing member on it. In many embodiments, at least a first part of the footing member lies between the second fence portion and the ground. Preferably, the first part of the footing member is sufficiently flexible to conform to the ground on which it is laid, and sufficiently compressible to enable the lower portion of the fence, which may be relatively inflexible, to adapt to variations in the surface of the ground. The footing member can, for example, be a felted or other nonwoven material, or an apertured material. The thickness of the footing member can for example be 0.08 to 1 inch, for example 0.08 to 0.25 inch, or 0.5-0.75 inch. The width of the first footing member can for example be 4-24 inches, e.g. 6-10 inches.

In some cases, a first part of the footing member lies between the second fence portion and the ground and a second part of footing member lies above at least part of the second fence portion. In such cases, the two parts of the footing member can be the same or different. The second part of a two-part footing member can for example be a woven fabric, a nonwoven fabric or an apertured fabric, and can have a width which is the same as, or different from, the width of the first part of the footing member. When the footing member has two parallel planar parts, they can be secured together at an outer edge away from the second fence portion, or the two parts can be part of a length of folded fabric.

When the footing member has an upper part which is above the second fence portion, it is preferably such that the shanks of securing members (which may for example be staples or nails having a length of, for example 4 to 12 inches, e.g. 6-8 inches) can be forced through it, but the heads of the securing members do not pass through it. The securing members are secured to the ground so that the fence is stabilized in the desired location. Optionally, the footing member, the lower fence portion and the securing members are such that the conformity between the first fence portion and the ground creates at least a partial seal which prevents water from running freely under the first fence portion.

A. Optional features of the assembly of the invention include the following.

(A1) the elongate footing member consists of a single strip at least part of which lies beneath the second fence portion.

(A2) (a) the second fence portion is substantially at right angles to the first fence portion and is parallel to the ground,
   (b) the elongate footing member comprises
      (a) a first lower elongate footing component at least part of which lies between at least part of the lower fence portion and the ground, and
      (b) a second upper elongate footing component which lies on top of at least part of the second fence portion, and
   (c) the securing members pass through the footing member and the lower fence portion.

Optionally, the outer edges of the first and second footing components are joined together, and at least part of the second portion of the fence is sandwiched between the first and second footing components.

(A3) (a) the lower portion of the fence is (i) substantially at right angles to the first fence portion and is parallel to the ground and (ii) comprises two elongate parallel components, and
   (b) at least part of the footing member lies between the two components of the lower fence portion (A4) (a) the second fence portion is (i) substantially coplanar with the first fence portion and (ii) comprises two elongate parallel components, and
   (b) a first part of the footing member lies between the two components of the second fence portion, and a second part of the footing member extends generally at right angles to the first and second fence portions in contact with the ground.

(A5) the footing member comprises a felted or other nonwoven material having a thickness of 0.25 to 1 inch, for example a thickness of 0.50 to 0.75. inch and a width of 4 to 24 inches.

B. Optional features of the method of the invention include the following.

(B1) the second fence portion and the elongate footing member are secured to each other before step (B).

(B2) the first and second fence portions and the elongate footing member are substantially coplanar during steps (B) and (C), and the method includes, after step (C), the step of
   (D) changing the angle between the first and second fence portions so that the second fence portion extends upwards from the ground.

(B3) the first and second fence portions and the elongate footing member are substantially coplanar after step (A), and before step (B) the first fence portion is bent at an angle to the second fence portion.

(B4) the steps (A) and (B) are carried out by placing the footing member on the ground and thereafter placing the second fence portion on top of the footing member.

(B5) the elongate footing member comprises
   (a) a first elongate footing component at least part of which lies between at least part of the lower portion of the fence and the ground, and
   (b) a second elongate footing component which lies on top of at least part of the second fence portion.

(B6) the second fence portion comprises two parallel components, and at least part of the footing member lies between the two components of the lower fence portion.

C. Optional features of the elongate fence of the third aspect of the invention include the following.

(C1) the footing member is secured to only one face of the second fence portion.

(C2) the footing member is a folded component which fits over and is secured to both faces of the second fence portion.

(C3) the second fence portion comprises two separate parallel layers and at least part of the footing member lies between the two separate layers.

(C4) the second fence portion is substantially at right angles to the first fence.

(C5) the first and second fence portions are substantially coplanar, and there is an elongate line of weakness between the first and second fence portions to enable the first and second fence portions to be bent so that they are substantially at right angles to each other.

THE DRAWINGS

The drawings illustrate exemplary assemblies of the invention, each having a first fence portion 11 which extends upwards from the ground, a second fence portion 12, a footing member 2, and a securing member 3 which secures the assembly to the ground 4.

In FIG. 1, the second fence portion 12 is parallel to the ground and the footing member 2 comprises upper and lower components 21 and 22 which sandwich the footing member 12 between them. In FIG. 1, the two components of the footing member are joined to each other along an outer edge, but they could be separate components with the second fence portion optionally protruding beyond them.

In FIG. 2, the second fence portion 12 is parallel to the ground, and the footing member 2 is a single strip of material which lies between the second fence portion 12 and the ground 4.

Figures 3, 4:
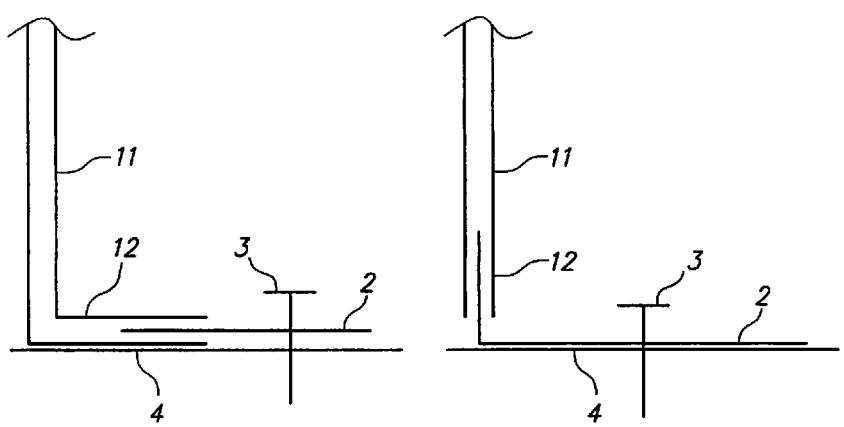

In FIG. 3, the second fence portion 12 is parallel to the ground and comprises upper and lower components 121 and 122 which are parallel to each other and which are open at the outer edge, and the footing member 2 is a single strip of material having one part which is sandwiched between the two components of the second fence portion and a second part which extends beyond the second fence portion 12. FIG. 3 shows a single securing member 3 which passes through the second part of the footing member, but the assembly optionally includes an additional securing member which passes through the second fence portion 12 and the first part of the footing member.

In FIG. 4, the second fence portion 12 is coplanar with the first fence portion 11 and extends upwards from the ground. The second fence portion has inner and outer components 121 and 122, and the footing member 2 has a first upwardly extending part 21 which lies between the inner and outer components of the second fence portion 12 and a second horizontal part 22 which is parallel to the ground.

The invention claimed is:

1. An assembly which comprises
   (1) an elongate area of ground;
   (2) an elongate fence (i) which extends along a line on the elongate area of ground, (ii) no part of which is buried a trench in the ground, and (iii) which comprises
      (a) a first elongate upper fence portion which (i) comprises apertures, and (ii) extends upwards from the ground and does not contact the ground, and
      (b) a second elongate lower fence portion which is not buried in the ground;
   (3) an elongate footing member (i) at least part of which contacts the second elongate fence portion, (ii) at least a part of which extends along the ground away from the first elongate upper fence portion, and (iii) stabilizes the fence along the line; and
   (4) securing members which secure the elongate footing member to the ground.

2. An assembly according to claim 1 wherein the elongate footing member (i) is separate from the first elongate upper fence portion and from the second elongate lower fence portion and (ii) consists of a single strip at least part of which lies beneath the second fence portion.

3. An assembly according to claim 1 wherein the footing member comprises a felted or other nonwoven material having a thickness of 0.25 to 1 inch.

4. A method of making an assembly as claimed in claim 1, the method comprising the steps of
   (A) providing an assembly which comprises (i) the elongate fence and (ii) the elongate footing member at least part of which is in contact with the second elongate lower fence portion;
   (B) before or after step (A), placing the elongate fence so that the second elongate lower fence portion extends along the line on the elongate area of ground, and the first elongate upper fence portion extends upwards from the ground; and
   (C) securing the footing member to the ground; and
wherein the method does not include making a trench in the ground.

5. A method according to claim 4 wherein the second elongate lower fence portion and the elongate footing member are secured to each other before step (B).

6. A method of making an assembly according to claim 1, the assembly comprising
   (1) an elongate area of ground;
   (2) an elongate fence which extends along a line on the elongate area of ground and which comprises
      (a) a first elongate upper fence portion which (i) comprises apertures, and (ii) extends upwards from the ground, and
      (b) a second elongate lower fence portion which is not buried in the ground;
   (3) an elongate footing member (i) which is separate from the first elongate upper fence portion and the second elongate lower fence portion (ii) at least part of which contacts the second elongate fence portion, (iii) at least a part of which extends along the ground away from the first elongate upper fence portion, and (iv) stabilizes the fence along the line; the footing member (a) comprising a felted or other nonwoven material having a thickness of 0.08 to 1 inch and a width of 4 to 24 inch, and
   (4) securing members which secure the elongate footing member to the ground;
the method comprising the steps of
   (A) providing an assembly which comprises (i) the elongate fence and (ii) the elongate footing member at least a part of which is in contact with the second elongate lower fence portion;
   (B) before or after step (A), placing the elongate fence so that the second elongate lower fence portion extends along the line on the elongate area of ground, and the first elongate upper fence portion extends upwards from the ground, the first and second elongate fence portions and the elongate footing member being substantially coplanar before step (B);
   (C) securing the footing member to the ground;
wherein
   (i) the second elongate lower fence portion and the elongate footing member are secured to each other before step (B),
   (ii) the first and second elongate fence portions and the elongate footing member are substantially coplanar before step (B), and
   (iii) the method includes, before or after step (C), the step of
   (D) changing the angle between the first and second elongate fence portion so that the second elongate upper fence portion extends upwards from the ground.

7. A method of making an assembly according to claim 1, the assembly comprising
   (1) an elongate area of ground;
   (2) an elongate fence which extends along a line on the elongate area of ground and which comprises
      (a) a first elongate upper fence portion which (i) comprises apertures, and (ii) extends upwards from the ground, and
      (b) a second elongate lower fence portion which is not buried in the ground;
   (3) an elongate footing member (i) which is separate from the first elongate upper fence portion and the second elongate lower fence portion (ii) at least part of which contacts the second elongate fence portion, (iii) at least a part of which extends along the ground away from the first elongate upper fence portion, and (iv) stabilizes the fence along the line; and
   (4) securing members which secure the elongate footing member to the ground;
the method comprising the steps of
   (A) providing an assembly which comprises (i) the elongate fence and (ii) the elongate footing member at least a part of which is in contact with the second elongate lower fence portion;
   (B) before or after step (A), placing the elongate fence so that the second elongate lower fence portion extends along the line on the elongate area of ground, and the first elongate upper fence portion extends upwards from the ground, the first and second elongate fence portions and the elongate footing member being substantially coplanar before step (B);

(C) securing the footing member to the ground;
wherein
(i) the second elongate lower fence portion and the elongate footing member are secured to each other before step (B),
(ii) the first and second elongate fence portions and the elongate footing member are substantially coplanar after step (A),
(iii) before step (B), the first elongate fence portion is bent at an angle to the second elongate fence portion, and
(iii) the method does not include making a trench in the ground.

8. A method of making an assembly according to claim 1, the method comprising the steps of
(A) providing an assembly which comprises (i) the elongate fence and (ii) the elongate footing member at least a part of which is in contact with the second elongate lower fence portion;
(B) before or after step (A), placing the elongate fence so that the second elongate lower fence portion extends along the line on the elongate area of ground, and the first elongate upper fence portion extends upwards from the ground, the first and second elongate fence portions and the elongate footing member being substantially coplanar before step (B); and
(C) securing the footing member to the ground;
wherein (i) the steps (A) and (B) are carried out by placing the elongate footing member on the ground and thereafter placing the second elongate lower fence portion on top of the elongate footing member, and (ii) the method does not include making a trench in the ground.

9. An assembly according to claim 1 wherein the elongate footing member comprises an apertured material.

10. An assembly which comprises
(1) an elongate area of ground;
(2) an elongate fence which extends along a line on the elongate area of ground and which comprises
  (a) a first elongate upper fence portion which (i) comprises apertures, and (ii) extends upwards from the ground, and
  (b) a second elongate lower fence portion which is not buried in the ground;
(3) an elongate footing member (i) which is separate from the first elongate upper fence portion and the second elongate lower fence portion, (ii) at least part of which contacts the second elongate fence portion, (iii) at least a part of which extends along the ground away from the first elongate upper fence portion, and (iv) stabilizes the fence along the line, and
(4) securing members which secure the elongate footing member to the ground,
wherein
(A) the second elongate lower fence portion is (i) substantially planar, (ii) substantially at right angles to the first elongate upper fence portion and (iii) parallel to the ground,
(B) the elongate footing member comprises
  (a) a first lower elongate footing component at least part of which lies between at least part of the second elongate lower fence portion and the ground, and
  (b) a second upper elongate footing component which lies on top of at least part of the second elongate lower fence portion, and
(C) the securing members pass through the first and second footing components and the second elongate lower fence portion.

11. An assembly according to claim 10 wherein outer edges of the first and second footing components are joined together, and at least part of the second elongate lower fence portion is sandwiched between the first and second footing components.

12. A method of making an assembly as claimed in claim 10, the method comprising the steps of
(A) providing an assembly which comprises the elongate fence and the elongate footing member at least part of which is in contact with the second elongate lower fence portion;
(B) before or after step (A), placing the elongate fence so that the second elongate lower fence portion extends along the line on the elongate area of ground, and the first elongate upper fence portion extends upwards from the ground substantially at right angles to the second elongate lower fence portion; and
(C) securing the footing member to the ground.

13. A method according to claim 12 wherein the second elongate lower fence portion and the elongate footing member are secured to each other before step (B).

14. An assembly which comprises
(1) an elongate area of ground;
(2) an elongate fence which extends along a line on the elongate area of ground and which comprises
  (a) a first elongate upper fence portion which (i) comprises apertures, and (ii) extends upwards from the ground, and
  (b) a second elongate lower fence portion which is not buried in the ground;
(3) an elongate footing member (i) which is separate from the first elongate upper fence portion and the second elongate lower fence portion, (ii) at least part of which contacts the second elongate fence portion, (iii) at least a part of which extends along the ground away from the first elongate upper fence portion, and (iv) stabilizes the fence along the line, and
(4) securing members which secure the elongate footing member to the ground,
wherein
(A) the second elongate lower fence portion comprises two elongate parallel components, and
(B) a first part of the elongate footing member lies between the two parallel components of the second lower elongate fence portion, and
(C1) the second elongate lower fence portion (i) is substantially planar, and (ii) is substantially coplanar with the first elongate upper fence portion, and the second part of the elongate footing member extends generally at right angles to first part of the elongate footing member and to the second lower elongate fence portion in contact with the around, or
(C2) the second elongate lower fence portion is substantially planar and extends at right angles to the first elongate upper fence portion, and a second part of the elongate footing member extends generally at right angles to the first upper fence portion in contact with the ground.

15. A method of making an assembly as claimed in claim 14, the method comprising the steps of
(A) providing an assembly which comprises the elongate fence and the elongate footing member, the first part of the elongate footing member lying between the two components of the second elongate lower fence portion, and the second part of the elongate footing member extending generally at right angles to the second lower elongate fence portion in contact with the ground;
- (B) before or after step (A), placing the elongate fence so that the second elongate lower fence portion extends along the line on the elongate area of ground, and the first elongate upper fence portion and the second elongate lower fence portion extend upwards from the ground; and
- (C) securing the footing member to the ground.

16. A method according to claim 15 wherein the second elongate lower fence portion and the elongate footing member are secured to each other before step (B).

17. An elongate fence which comprises
- (1) a first elongate upper fence portion which comprises open apertures,
- (2) a second elongate lower fence portion which (i) is substantially planar, and (ii) is secured to the first elongate upper fence portion along an elongate line, and
- (3) an elongate footing member (i) which is separate from the first elongate upper fence portion and the second elongate lower fence portion, (ii) at least part of which contacts the second elongate fence portion, (iii) at least a part of which extends away from the first elongate upper fence portion, (iv) which stabilizes the fence along the line, and (v) no part of which extends downwards away from the first elongate upper fence portion;

wherein the footing member is secured to only one face of the second elongate lower fence portion.

18. An elongate fence according to claim 17 wherein the second elongate lower fence portion is substantially at right angles to the first elongate fence portion.

19. An elongate fence according to claim 17 wherein the footing member comprises an apertured material.

20. An elongate fence according to claim 19 wherein the footing member comprises a felted or other nonwoven material having a thickness of 0.08 to 1 inch and a width of 4 to 24 inch.

* * * * *